United States Patent [19]

Mawatari et al.

[11] Patent Number: 4,922,115
[45] Date of Patent: May 1, 1990

[54] FLUORESCENT GLASS DOSIMETER

[75] Inventors: Yasushi Mawatari, Shizuoka; Toru Ikegami, Shimada; Motoyuki Sato, Shizuoka, all of Japan; Bertram Burgkhardt, Karlsruhe; Ernst Piesch, Eggenstein-Leopoldshafen; Hans-Gerd Röber, Karlsruhe, all of Fed. Rep. of Germany

[73] Assignees: Toshiba Glass Co., Ltd., Shizuoka, Japan; Kernforschungszentrum Karlsruhe GmbH, Karlsruhe, Fed. Rep. of Germany

[21] Appl. No.: 213,931

[22] Filed: Jun. 30, 1988

[30] Foreign Application Priority Data

Dec. 28, 1987 [JP] Japan ................ 62-334649

[51] Int. Cl.⁵ .................. H05B 33/00; G01J 1/58
[52] U.S. Cl. .................. 250/484.1; 250/485.1
[58] Field of Search .............. 250/484.1, 482.1, 474.1, 250/505.1, 515.1, 485.1; 292/341.16

[56] References Cited

U.S. PATENT DOCUMENTS 3,919,869 11/1975 Fromm ...................... 292/341.16
4,772,796 9/1988 Studer et al. ................ 250/484.1

FOREIGN PATENT DOCUMENTS 50-530875  5/1975  Japan .
53-77575   7/1978  Japan .
61-4987    6/1984  Japan .
61-4988    6/1984  Japan .
60-10192   1/1985  Japan .
60-73479   4/1985  Japan .
63-79085   4/1988  Japan .

OTHER PUBLICATIONS

Radiation Protection Dosimetry, vol. 6, No. 1-4, pp. 287-289, "Phosphate Glass Energy Compensation Filters for the Measurement of Operational Dose Quantities", B. Burgkhardt et al.

Primary Examiner—Constantine Hannaher
Assistant Examiner—J. Eisenberg
Attorney, Agent, or Firm—Oblon, Spivak, McClelland, Maier & Neustadt

[57] ABSTRACT

A fluorescent glass dosimeter comprises a glass element holder including inner and outer envelopes. Each of the inner and outer envelopes has a mask frame used for covering the peripheral portions of the corresponding fluorescent detection surface of a fluorescent glass element. The fluorescent glass dosimeter further comprises upper and lower cases. The upper case serves as a pivotable lock member and includes a lock portion, the locking condition of which can be released by means of a magnet. The lower case is adapted to receive the glass element holder. The upper and lower cases are engageable with each other at their slide portions. The glass element holder includes an integral index plate havig an identification hole code at a predetermined location. A direction regulating member is provided for the lower case, and a portion engageable with the direction regulating member is provided for the glass element holder. The fluorescent glass holder is positioned as a result of the engagement between the direction regulating member and the engageable portion of the glass element holder. A filter, used for adjusting energy dependency upon a radiation exposure, is located on the inner side of the upper wall of each of the upper and lower cases. A filter, used for adjusting direction dependency upon an incident radiation, is located on the inner side of the side wall of the lower case.

5 Claims, 4 Drawing Sheets

FLUORESCENT GLASS DOSIMETER

BACKGROUND OF THE INVENTION

1. Field of the Invention

The present invention relates to a fluorescent glass dosimeter utilized for measuring a radiation exposure dose of a radiation equipment operator, a spatial dose distribution inside and around radiation equipment such as a power-generating atomic reactor, an exposure dose upon radiotherapeutics and, more particularly, to a fluorescent glass dosemeter having improved glass element holder and holder case.

2. Description of the Related Art

In general, the more the amount of energy, i.e., radiation dose, a living body is exposed the more the body is in danger and the more the environment is negatively influenced. Therefore, persons who install an atomic reactor, an accelerator, an X-ray generator, and a radioisotope must perfectly manage radiation, and for operators and users, measurement of radiation dose is inevitable. For this reason, the role of a dosimeter for measuring a radiation dose with high precision is increasingly important.

In a fluorescent glass dosimeter, a glass element holder for holding a fluorescent glass element and a holder case for storing the holder constitute a capsule. During operation, the capsule storing the glass element holder is carried or is equipped on a proper location, and upon measurement, a large number of capsules are automatically loaded to a dose read-out instrument using a magazine or are manually set therein to measure a radiation dose.

Figure 7:
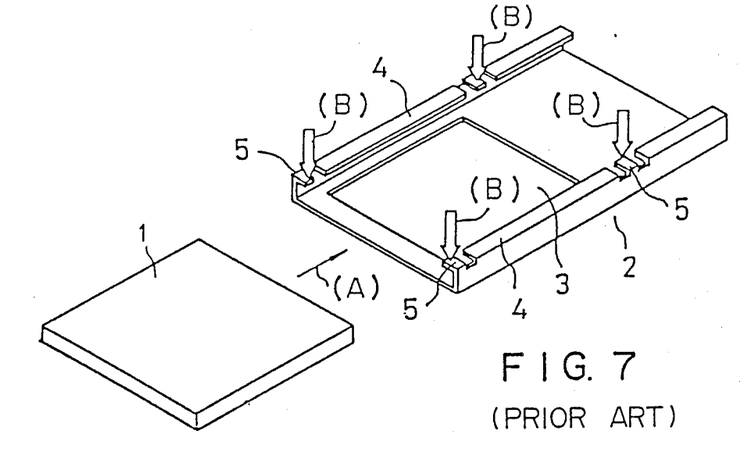
FIG. 7 is an exploded perspective view of a glass element holder.

In the conventional fluorescent glass dosimeter described above, in particular, in the glass element holder, as shown in FIG. 7, fluorescent glass element 1 is fitted in outer holder 2 from a direction indicated by an arrow (A) in FIG. 7 while being in sliding contact therewith. Fluorescence detection window 3 having a size slightly smaller than the outer shape of fluorescent glass element 1 is formed in outer holder 2, and "]"-shaped bent segments 4 for holding glass element 1 are provided on two side edge portions of outer holder 2 on a side perpendicular to a glass element insertion direction. Anti-removal pawls 5 are provided on portions of bent segments 4, i.e., end portions on the glass element insertion side and positions separated from the end portions by a predetermined distance.

Figure 8:
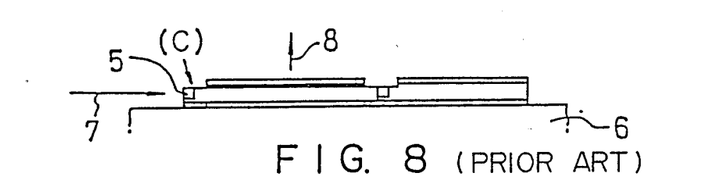
FIG. 8 is a sectional view of the glass element holder for explaining a drawback of the conventional dosimeter.

Therefore, in such a glass element holder, fluorescent glass element 1 is inserted to a predetermined position of outer holder 2 along the direction indicated by an arrow (A) in FIG. 7. Thereafter, pawls 5 are pressed and bent from the direction indicated by an arrow (B) in FIG. 7, thereby fixing fluorescent glass element 1 in outer holder 2. When a radiation dose is measured, a capsule is placed on measurement table 6, as shown in FIG. 8. When ultraviolet rays 7 are incident on fluorescent glass element 1 from a narrow side surface thereof from the direction indicated by an arrow in FIG. 8, fluorescence 8 based on a radio photoluminescence phenomenon is detected from a wide surface of fluorescent glass element 1 in a direction perpendicular to the ultraviolet ray incident direction, and a radiation dose is measured from the intensity of fluorescence 8.

Figure 9:
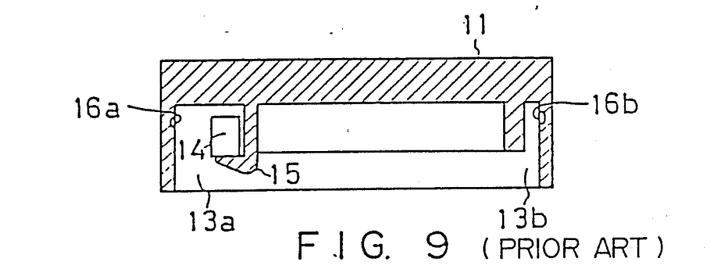
FIGS. 9 and 10 are sectional views of a capsule for explaining a lock mechanism of the dosimeter.
Figure 10:
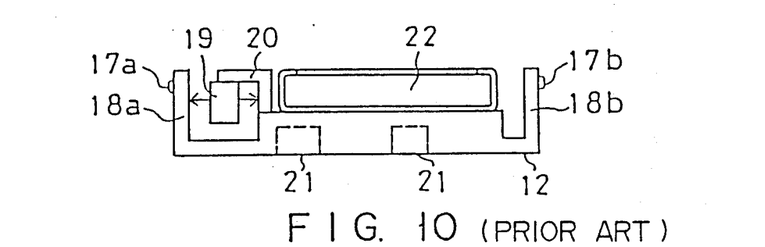

A case for storing the glass element holder is divided into upper and lower cases 11 and 12, as shown in FIGS. 9 and 10. Slide grooves 13a and 13b are formed at positions relatively adjacent to side walls of upper case 11 in a direction of thickness. L-shaped lock projection member 15 is suspended at an intermediate portion between slide grooves 13a and 13b. Reference numerals 16a and 16b denote recesses formed in the groove surfaces. Slide segments 18a and 18b having, on their outer side surfaces, projections 17a and 17b respectively engaged with recesses 16a and 16b, are provided to lower case 12. Metal member 19, which is normally biased to the right indicated by an arrow in FIG. 10 by a leaf spring (now shown), is arranged inside lower case 12. Inverted L-shaped lock projection member 20 is mounted on the bottom surface of lower case 12. Four jig insertion square holes 21 are formed in the outer bottom surface of lower case 12 at predetermined intervals. Reference numeral 22 denotes a storage portion for glass element holder.

Therefore, in this capsule, after the glass element holder shown in FIG. 7 is stored in storage portion 22 of lower case 12, slide segments 18a and 18b of lower case 12 are inserted in slide grooves 13a and 13b. Before insertion, metal member 19 of lower case 12 is urged against the inner side surface of inverted L-shaped lock projection 20. When lower case 12 is inserted in upper case 11, L-shaped projection 15 of upper case 11 urges metal member 19 to the left in FIG. 10 to move it to the position shown in FIG. 10. When lower case 12 is completely inserted, metal member 19 is returned to an original position by the leaf spring and is clamped between projections 15 and 20 to make a lock. And projections 17a and 17b of lower case 12 are engaged with recesses 16a and 16b of the upper case to make an auxiliary lock.

When the lock is to be released, a magnet approaches from outside slide segment 18a, metal member 19 is attracted on the inner wall of slide segment 18a to be unlocked. Thus, lower case 12 can be removed from upper case 11.

However, the above-mentioned capsule poses the following problems. First, in the glass element holder, both side edge portions of fluorescent glass element 1 in a direction perpendicular to the glass element insertion direction are masked with bent segments 4 of outer holder 2. However, other edges, in particular, edge portions (C) on the side of the detection surface are not masked. Therefore, detection sensitivity varies depending on a chamfering width of the edge portion (C), and this variation causes the large influence on measurement precision. Fluorescent glass element 1 is fixed by bending pawls 5 of outer holder 2. However, the bending operation is cumbersome, and may damage fluorescent glass element 1.

In the holder case, cases 11 and 12 are manually engaged. Upon removal of the cases, a jig is inserted in four square holes 21 of lower case 12 to clamp it, and then, upper case 11 is removed. However, the slide length corresponds to the direction of thickness and hence is short. For this reason, upon removal, it is difficult to apply a relatively large and uniform force to cases 11 and 12. In addition, if upper case 12 is removed while being slightly inclined, slide segments 18a and 18b may be damaged. In a fluorescent glass dosimetry system, a large number of capsules are sequentially loaded to a dose read-out instrument, while the glass element holder is removed from each case to read a radiation dose. When a predetermined dose is measured, the glass element holder is removed from cases 11 and 12. Since the case is opened/closed in the vertical direction, it is difficult to automate the opening/closing mechanism. For this reason, the case cannot be quickly and reliably opened/closed Cases 11 and 12 are locked by inserting metal member 19 between L-shaped lock projections 15 and 20. However, the lock function is not effective since the slide length corresponds to the direction of thickness of the capsule and hence is short. Recesses 16a and 16b and projections 17a and 17b are provided to the slide portions to effect an auxiliary lock. However, the lock mechanism is complicated accordingly, and reliability is inevitably degraded. Upon removal of the case, the jig is inserted in square holes 21 of lower case 12. The outer shape of the capsule is small, e.g., 2×3 cm, and the opening of each square hole 21 is very small. For this reason, it is difficult to insert the jig therein. Since cases 11 and 12 are plastic injection-molded products, projections for engaging the jig with square holes 21 cannot be formed. For this reason, upon removal of the case, lower case 12 is often removed from the jig, thus disturbing a removal operation.

SUMMARY OF THE INVENTION

The present invention has been made to solve the above problems, and has as its object to provide a fluorescent glass dosimeter wherein a fluorescent glass element can be easily loaded, the corners of the glass element can be appropriately masked, a capsule can be reliably locked, and insertion/removal of cases can be easily performed.

A first invention is a fluorescent glass dosimeter comprising a fluorescent glass element in which radiophotoluminescence is emitted through excitation caused by ultraviolet rays, and a glass element holder including an inner holder which has a mask frame for covering a peripheral portion of one fluorescence detection surface serving as a side of generating the fluorescence of the fluorescent glass element, and externally holds the fluorescent glass element while at least an ultraviolet incident surface is left uncovered, and an outer holder in which the inner holder is slidably fitted, and has a mask frame for covering a peripheral portion of the other fluorescence detection surface as a side of generating the fluorescence of the fluorescent glass element.

A second invention is a fluorescent glass dosimeter comprising a glass element holder for holding a fluorescent glass element while masking peripheral portions of both fluorescence detection surfaces of the fluorescent glass element, a lower case, having slide portions having a predetermined length on both side surfaces, for fitting the glass element holder therein, and an upper case which has slide portions which slidably engage with the slide portions of the lower case therein, and is equipped with a lock member which is normally pivoted in a direction of the lower case to perform locking and is pivoted in a direction opposite to the lower case to release the locking when a magnet is approached externally, the lock member being provided with a magnet segment or a magnetizing member.

A third invention is a fluorescent glass dosimeter comprising a glass element holder for holding a fluorescent glass element while masking peripheral portions of both fluorescence detection surfaces of the fluorescent glass element, a case in which the glass element holder is fitted, and an index plate having an identification hole code arranged, at a predetermined position of an integrally extended portion of the glass element holder, or at a predetermined position of an inner wall of the case.

A fourth invention is a fluorescent glass dosimeter comprising a glass element holder for holding a fluorescent glass element while masking peripheral portions of both fluorescence detection surfaces of the fluorescent glass element, a lower case in which the glass element holder is fitted, a direction regulating member for glass element provided to the lower case, and an engaging portion which is arranged on one side surface of the glass element holder and is engaged with the direction regulating member for positioning the fluorescent glass element.

A fifth invention is a fluorescent glass dosimeter comprising a glass element holder for holding a fluorescent glass element while masking peripheral portions of both fluorescence detection surfaces of the fluorescent glass element, upper and lower cases in which the glass element holder is fitted, filters, which are arranged on inner walls of the upper and lower cases opposing the fluorescence detection surfaces of the fluorescent glass element and each of which comprises at least one metal member selected from the group consisting of Sn, Cu, Fe, Al, Pb, and Cd, for adjusting energy dependency upon a radiation exposure, and filters, which are arranged at a position near the glass element holder fitting position of the lower case and on an ultraviolet incident side and a side opposite thereto or on all side surfaces, for adjusting direction dependency upon an incident radiation.

With the above-mentioned means of the first invention, when a fluorescent glass element is fitted in an inner holder, a peripheral portion of one fluorescence detection surface of the fluorescent glass element is masked with a mask frame of the inner holder.

When the inner holder with the fluorescent glass element is mounted on an outer holder, the peripheral portion of the other fluorescence detection surface of the fluorescent glass element is masked with a mask frame of the outer holder. Therefore, all the peripheral portions of the fluorescence detection surfaces of the fluorescent glass element can be masked, and detection sensitivity can no longer be influenced by variations in chamfering width.

With the above-mentioned means of the second invention, slide portions extending in the direction of depth of lower and upper cases are slidably engaged, thus allowing easy insertion/removal. In a normal state, the cases can be locked by pivotal movement of a magnet segment or a magnetizing member. When a magnet comes closer from the outside, the magnet segment or the magnetizing member inside the case is attracted by the magnet to unlock the case. Therefore, the locking operation can be reliably performed without providing a double-lock mechanism.

With the above-mentioned means of the third invention, upon replacement of a fluorescent glass element, an index plate having an identification hole code arranged at a portion of a glass element holder or attached to the ceiling of the case is utilized to read a glass element identification number by a dose read-out instrument. Thus, persons who posses the dosimeters can be reliably managed, because being able to use this identification number as a personal identification number.

Further, since the glass element holder is formed of a heat-resisting material, a heat process for eliminating the fluorescent element in the glass element and returning it to the initial state can be performed while the element is maintained in the holder. Thus, the glass element is protected by the holder during the heat process. Consequently, contamination and damage are less likely to result, and the handling of the element is easy. Also, since the glass element and the holder are not separated during the heat process, the opening code for identification assigned to each of the glass element holders does not change after the heat process. Thus, data management for each glass element is continuously performed with certainty.

With the above-mentioned means of the fourth invention, when a glass element holder storing the fluorescent glass element is housed in a lower case, whether the fluorescent glass element is properly set can be discriminated from whether or not the engaging portion of the glass element holder is engaged with a direction regulating member of the lower case.

With the above-mentioned means of the fifth invention, energy dependency upon a radiation exposure can be adjusted by filters which is provided to the ceiling of each case and comprises at least one metal member selected from the group consisting of Sn, Cu, Fe, Al, Pb, and Cd. In addition, direction dependency upon an incident radiation can be adjusted by filters arranged adjacent to a mounting position of the glass element holder in the lower case.

BRIEF DESCRIPTION OF THE DRAWINGS

FIGS. 1 to 6 are views for explaining first to fifth inventions, in which

FIGS. 7 to 10 are views for explaining a conventional fluorescent glass dosimeter, in which

DETAILED DESCRIPTION OF THE PREFERRED EMBODIMENTS

Figure 1:
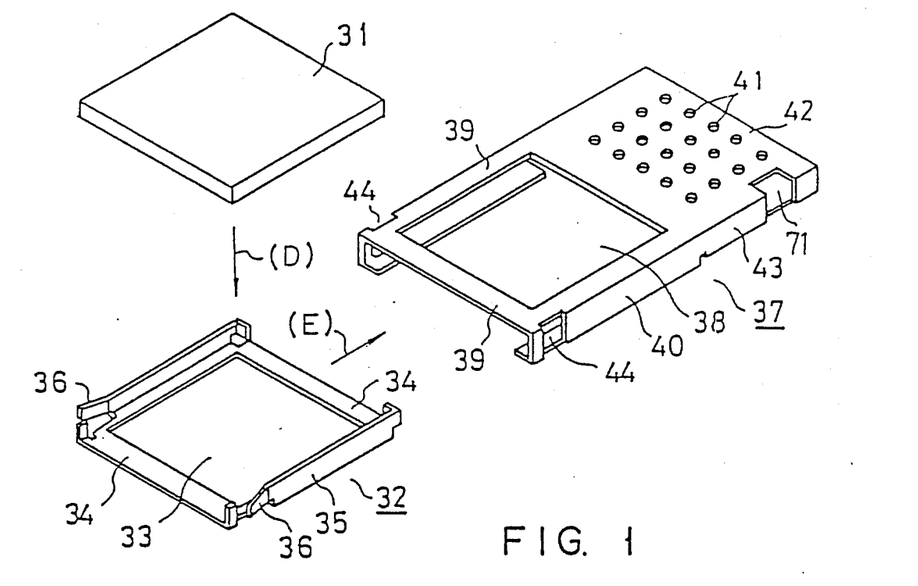
FIG. 1 is an exploded perspective view of a glass element holder.

The arrangement of a glass element holder as an embodiment of the first invention will now be described with reference to FIG. 1. In FIG. 1, reference numeral 31 denotes a fluorescent glass element which adopts, as a base, silver-activated phosphate glass containing a large amount of Li and Na having a small atomic number without containing, e.g., K and Ba. However, the glass element may consist of a component mixture of various components (Li, Na, P, 0, Al, Ag, and the like) depending on its objects and applications. In particular, since the glass element contains a large amount of Li and Na, a fading in fluorescent power is very small after irradiation, and a stable characteristic against a change in temperature can be obtained.

The size of fluorescent glass element 31 varies depending on its objects. For example, a 16×16×1.5 (mm) glass element is employed and is fitted in inner holder 32 from a direction (D) in FIG. 1. Inner holder 32 comprises mask frame 34 having a fluorescence detection window 33 with a smaller opening than the outer size of fluorescent glass element 31 in order to mask the entire peripheral portion of one fluorescence detection surface of fluorescent glass element 31. Holding segments 35 for externally holding fluorescent glass element 31 are mounted on the two opposing sides of mask frame 34. For this reason, the edge portion on one surface side of fluorescent glass element 31 can be masked by mask frame 34 over the entire periphery, and the glass element can be reliably held by holding segments 35 having small elasticity. Since the rear end of each holding segment 35 is bent toward the other segment, the movement of glass element 31 is disturbed. Meanwhile, spring pawls 36 which are slightly tapered outwardly project from the front ends of the holding segments. Spring pawls 36 serve an anti-removal function after the inner holder is mounted in an outer holder, as will be described later.

Fluorescent glass element 31 fitted in inner holder 32 in this manner is fitted in outer holder 3 while being in sliding contact therewith along a direction indicated by an arrow (E) in FIG. 1. Outer holder 37 comprises mask frame 39 having fluorescence detection lower window 38 having substantially the same opening as that of window 33 of inner holder 32 in order to mask the peripheral portion of the other fluorescence detection surface (a front surface in FIG. 1) of fluorescent glass element 31. Inner holder holding segments 40 having a "]"-shaped section are provided to the two sides of mask frame along the sliding contact direction of inner holder 32. Therefore, the peripheral portions of the both surfaces of fluorescent glass element 31 can be completely masked by mask frame 34 of inner holder 32 and mask frame 39 of outer holder 37. Therefore, detection sensitivity cannot be influenced by variations in chamfering width unlike in the conventional holder. In other words, fluorescence scattered by diffused reflection from the edge portions of the ultraviolet incident surface of fluorescent glass element 31 can be masked.

Outer holder 37 comprises index plate 42 having an identification hole code for glass element identification, which is able to use as a personal identification, along the sliding contact direction of inner holder 32. Index plate 42 also has "]"-shaped segments 43 on the same sides as those of holding segments 40. The height of each "]"-shaped segment 43 is set to be smaller than that of holding segment 40, so as to serve as a positioning stopper for precisely stopping the inner holder at a predetermined position. Hole 44 is formed in the front end of each holding segment 40. When inner holder 32 is completely fitted in outer holder 37, spring pawls 36 of the inner holder are engaged with holes 44 by their biasing force. As a result, inner holder 32 can be prevented from being removed from outer holder 37, and cannot be removed therefrom as long as it is drawn in a direction opposite to the direction indicated by an arrow (E) while spring pawls 36 are manually or mechanically pressed inwardly.

Therefore, with the arrangement of the above embodiment, fluorescent glass element 31 can be easily fitted in inner holder 32 by only urging it against the inside of holding segments 35. When the inner holder is inserted in outer holder 37 in this state, it can be reliably set and stopped at a predetermined position by "]"-shaped segments 43 on the side of index plate 42, and spring pawls 36 of inner holder 32 are engaged with holes 44 of outer holder 37 to serve an anti-removal function. When fluorescent glass element 31 is attached to inner and outer holders 32 and 37 as a holder, the entire peripheral portions of the both fluorescence detection surfaces can be completely masked by mask frames 34 and 39. Thus, detection sensitivity cannot be influenced by variations in chamfering width since the edge portions of the glass element can be completely masked. Therefore, a fluorescence can be stably detected with high precision. The holder can be assembled only by fitting fluorescent glass element 31 and inserting inner and outer holders 32 and 37, and this can greatly contribute to efficient assembly.

In the above embodiment, spring pawls 36 are provided in order to prevent removal of inner holder 32.

Instead, curved projections may be provided. "]"-shaped segments 43 of index plate 42 are used for positioning inner holder 32. However, equivalent members can be easily attached without providing index plate 42.

Figure 2:
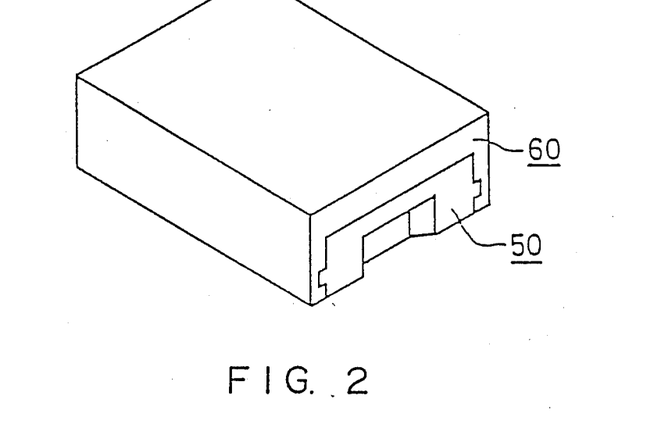
FIG. 2 is a perspective view showing the outer appearance of a capsule.
Figure 3:
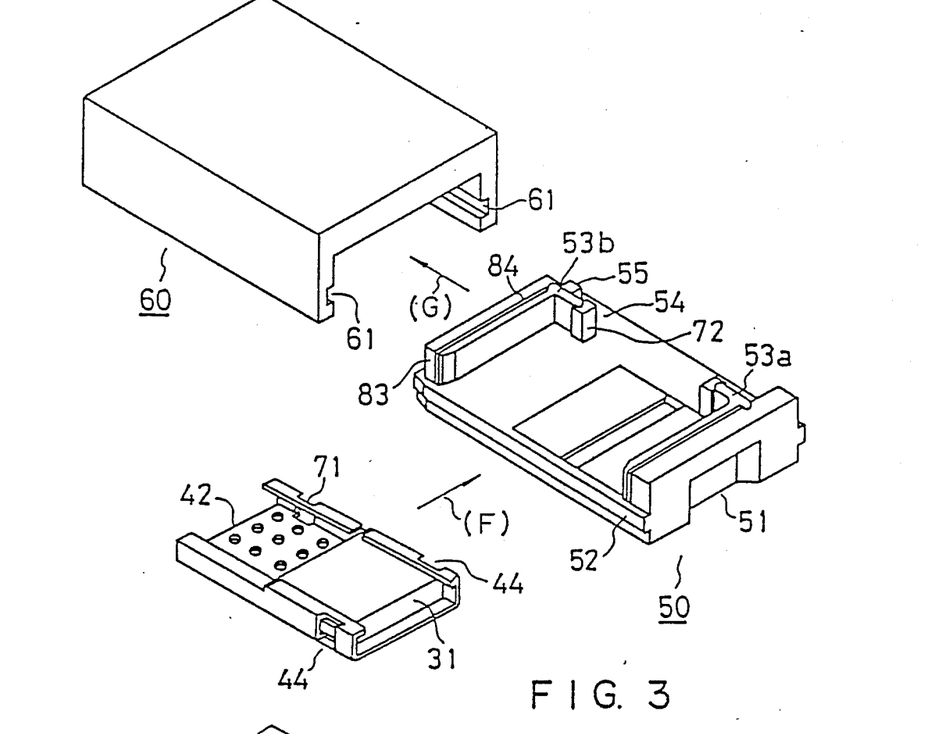
FIG. 3 is an exploded perspective view showing an assembling order of the capsule.
Figure 4:
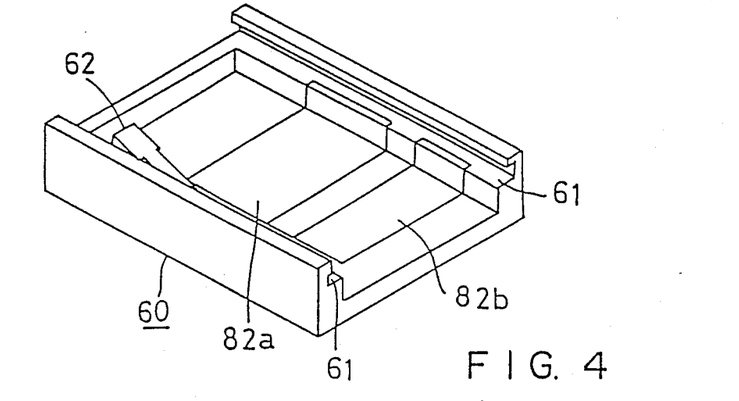
FIG. 4 is a view showing the positional relationship of filters.

An embodiment of the second invention will now be described with reference to FIGS. 2 to 4. FIG. 2 is a view showing an outer appearance of a capsule storing a glass element holder, FIG. 3 is an exploded view of the capsule, and FIG. 5 is a view for explaining a lock mechanism. More specifically, the capsule is constituted by lower and upper cases 50 and 60, excluding the glass element holder shown in FIG. 1. An engaging portion, e.g., recess 51 is formed in lower case 50 to allow easy insertion/removal with respect to upper case 60 by hitching a finger or nail on the front surface side, and slide portions 52 having a projecting section are provided in a predetermined length. Holder guide members 53a and 53b project inside lower case 50 so as to position and store the glass element holder when it is inserted from a direction indicated by an arrow (F) in FIG. 3, i.e., from the side portion (upward direction). Holder guide members 53a and 53b are arranged to be separated by a distance equal to the length in the direction of depth of the glass element holder, and are formed into an inverted L-shape to stop the holder at a predetermined position. Lock mechanism space 54 is separated inwardly from an edge portion by a predetermined distance on a side opposite to the insertion side of the glass element holder. Reference numeral 55 denotes a lock reception segment as a part of a lock mechanism.

Upper case 60 is formed to have an inverted recess-shaped section. Recessed slide portions 61 which are slidably engaged with tapered slide portions 52 are formed in the direction of depth on the two side inner wall portions of upper case 60. Upper case 60 has a lock mechanism occupying a space portion corresponding to lock mechanism space 54. In the lock mechanism, more specifically, leaf spring 62 as a lock member extends in a direction corresponding to the direction of lock mechanism space 54. One end, i.e., a case front surface side portion, of the leaf spring is fixed to the case ceiling, and the other end is fixed to magnet segment having a given polarity or magnetizing member 63. Movement prevention member 64 for preventing movement of magnet segment or magnetizing member 63 in the back-and-forth direction is suspended from the ceiling of upper case 60. Reference numeral 65 denotes an unlocking magnet. Unlocking magnet 65 is attached to a dose read-out instrument to unlock a capsule.

Figure 5A:
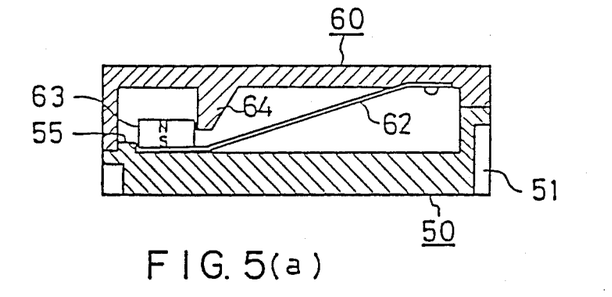
FIGS. 5(a) and 5(b) are sectional views of the capsule for explaining a lock mechanism.

Therefore, with the arrangement of the above embodiment, lower case 50 is held while storing the glass element holder, and is pressed in a direction indicated by an arrow (G) in FIG. 3 while the rear end portions of slide portions 52 of lower case 50 are engaged with corresponding slide portions 61 of upper case 60, so that lower case 50 can be easily inserted in upper case 60 using slide portions 61 as a guide. During insertion of case 50 into case 60, leaf spring 62 as the lock mechanism is pivoted in a direction apart from the ceiling of upper case 60, as shown in FIG. 5(a).

Figure 5B:
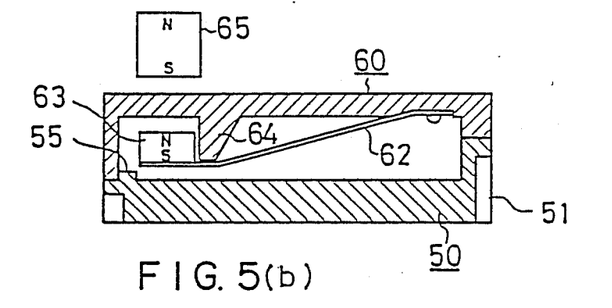

As lower case 50 is inserted deeper, lock reception segment 55 of lower case 50 contacts the lower surface of leaf spring 62 to press it toward the ceiling of upper case 60. Therefore, lower case 50 can be smoothly inserted in upper case 60. In a state wherein lower case 50 is completely stored in upper case 60, leaf spring 62 is pivoted in a direction apart from the ceiling of upper case 60, as shown in FIG. 5(a), and magnet segment or magnetizing member 63 is completely clamped between lock reception member 55 of lower case 50 and movement prevention member 64 of upper case 60. That is, the cases can be perfectly locked by a very simple mechanism. Therefore, even if lower case 50 is to be drawn outwardly in this state, magnet segment or magnetizing member 63 is engaged with prevention member 64, and the lower case cannot be removed. In this state, the case cannot be freely opened by a person other than authorized persons. In order to remove lower case 50, magnet 65 having a magnetic polarity opposite to that of magnet segment or magnetizing member 63 is externally approached, as shown in FIG. 5(b), magnet segment or magnetizing member 63 is pivoted in the ceiling direction of upper case 60 and is stopped at a position as shown in FIG. 5(b). Therefore, when lower case 50 is drawn in this state, it can be easily removed. Such lock mechanism can be realized, if lock member is fixed to a lower case. But this has no practical use, because the lock member disturbs taking a glass element holder in and out.

An embodiment of the third invention will now be described with reference to FIG. 1. In a dosimeter according to this invention, as shown in FIG. 1, inner holder 32 in which fluorescent glass element 31 is fitted is slidably engaged in outer holder 37, so that the entire peripheral portions of the fluorescence detection surfaces of fluorescent glass element 31 are masked by mask frames 34 and 39 as has been described above. In particular, a difference is that inner holder 32 and outer holder 37 are formed of a heat-resisting material such as metal, ceramics or the like, and sides of outer holder 37 are extended opposite to the insertion direction of inner holder 32 by a proper length, and index plate 42 having identification hole code 41 for identifying and managing a person, a dosimeter installation place or the like is arranged on the extended portion.

With this arrangement, the case is loaded to a dose read-out instrument, and only fluorescent glass element 31 is removed from the case or the glass element holder with element 31 is removed therefrom to read a radiation dose, or an identification hole code is optically read upon replacement of glass element holders. In this manner, the identification code can be easily stored in a memory, and a person who possesses a dosimeter and an exposure level of the person by a radiation including exposure history thereafter can be managed. In addition, since the index plate is integrally arranged on outer holder 37, it can be easily handled and managed.

In this embodiment, the inner holder and the outer holder are formed of stainless steel. Therefore, the heat process can be performed while the glass element is held in the inner holder and outer holders. More specifically, a glass element is assigned an opening code for identification provided at the extended portion of the outer holder, and its assignment combinations are not changed after a heat process. If a specific piece of information of each glass element such as sensitivity correction or the like is assigned to an opening code for identification, the information specific to each glass element can be utilized continuously irrespective of the number of heat processes performed, or not performed.

Index plate 42 is integrally arranged on outer holder 37, but can be separately arranged, such that it can be attached only by pushing it in the ceiling of lower or upper case 50 or 60. For example, leaf springs project from positions of the case ceiling corresponding to two or four sides of index plate 42, and the index plate can be pushed among the leaf springs to be attached and fixed thereto.

An embodiment of the fourth invention will now be described with reference to FIGS. 1 to 3. In this dosimeter, engaging portion 71 is formed by notching a predetermined portion of "]"-shaped segment 43 of index plate 42 extending from outer holder 37 or of holding segment 40 of outer holder 37. Glass element direction regulating member 72 is provided to lower case 50 at an abutting position of the end portion of holder guide member 53b, so that fluorescent glass element 31 can be reliably positioned on the front surface side of the case. More specifically, when the glass element holder is attached to lower case 50 from the side or above, as shown in FIG. 3, engaging portion 71 of outer holder 37 is engaged with glass element direction regulating member 72 of lower case 50, and fluorescent glass element 31 is precisely positioned at the front surface side of the case. Thus, a setting error of fluorescent glass element 31 inside the capsule can be prevented. Note that the numbers of engaging portion 71 and glass element direction regulating member 72 are respectively one but may be two. In this case, these members are arranged to be separated by a predetermined distance, as a matter of course.

Figure 6:
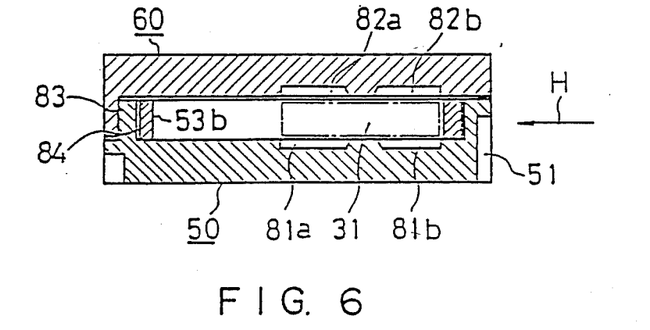
FIG. 6 is a view showing the positional relationship of filters.

An embodiment of the fifth invention will now be described with reference to FIGS. 1, 3, and 6. In this dosimeter, the peripheral portions of both fluorescence detection surfaces of fluorescent glass element 31 are masked by using mask frames 34 and 39 of inner and outer holders 32 and 37 in the same manner as in the first invention. A difference between the first and fifth inventions is that tin filters are arranged on ceiling surfaces of lower and upper cases 50 and 60 facing fluorescence generation sides perpendicular to the ultraviolet ray incident side (indicated by an arrow (H) in FIG. 6) of fluorescent glass element 31, an imaginary position of which is indicated by an alternate long and short dashed line in FIG. 6, i.e., the both wide side surfaces of element 31 serving as fluorescence detection surfaces. Pairs of tin filters (81a, 81b), (82, 82b) are arranged on the ceiling surfaces of lower and upper cases 50 and 60 to adjust energy dependency of a radiation exposure. These tin filters (81a, 81b), 82a, 82b) adjust sensitivity difference with respect to exposures having different photon energies, and are arranged to have a predetermined gap between opposing surfaces and are outwardly tapered to adjust the dependency of the incident direction of the radiation. Stopper member 83, which abuts against the rear end face inside the upper case so as to top the upper case, projects on the rear end portion side of lower case 50, as shown in FIG. 3. Filters 84 for adjusting direction dependency of an incident radiation are arranged between stopper member 83 and holder guide member 53b and at a position opposite thereto. Filters 84 for adjusting the direction dependency of incident radiation are arranged on two sides, i.e., an ultraviolet incident side and on a side opposite thereto of the upper case. However, these filters may be arranged on other two sides, i.e., all the side surfaces of the upper or lower case so as to regulate the direction dependency.

According to the present invention as described above, a fluorescent glass element can be attached to an inner holder easily since a fit-in type is adopted, and the entire peripheral portions of both fluorescence detection surfaces of the fluorescent glass element can be masked by mask frame of the inner and outer holders upon attachment of the fluorescent glass element. Thus, variations in detection sensitivity due to variations in chamfering width of the fluorescent glass element can be eliminated. In the second invention, the capsule can be reliably locked in a perfect tight-seal state by a simple arrangement without arranging a double-lock mechanism unlike in the conventional structure. Only when a special unlock mechanism is used, the glass element holder can be easily removed. In the third invention, the glass element holder is made of a heat-resisting material, and a possession state of an individual person can be effectively managed upon attachment of an index plate, the information assigned to each glass element can be continuously utilized before and after the heat process of the glass elements, and radiation management can be perfectly performed. In the fourth invention, a fluorescent glass element can be appropriately attached or removed without errors. In the fifth invention, energy dependency of radiation, and direction dependency of incident radiation can be appropriately adjusted.

What is claimed is:

1. A fluorescent glass dosimeter comprising:
   a fluorescent glass element having both a fluorescence detection surface and chamfers at a periphery of each surface, in which radiophoto-luminescence is emitted through excitation by means of ultraviolet rays; and
   a glass element holder including an inner holder which has a mask frame for covering the chamfers of one fluorescence detection surface of said fluorescent glass element, and externally holds said fluorescent glass element while at least an ultraviolet ray incident surface is left uncovered, and an outer holder in which said inner holder is slidably fitted, has a mask frame for covering the chamfers of the other fluorescence detection surface at a side of generating the fluorescence of said fluorescent glass element;
   said outer holder having a hole and said inner holder having a pawl for engaging with the hole, thereby the inner holder being fixed to the outer holder when the inner holder is completely fitted in the outer holder.

2. A fluorescent glass dosimeter comprising:
   a glass element holder for holding a fluorescent glass element while masking peripheral portions of both fluorescence detection surfaces of said fluorescent glass element;
   a lower case having tapered side portions having a predetermined length, on both side surfaces, for fitting said glass element holder therein; and an upper case which has slide portions which slidably engage with the slide portions of said lower case therein; and is equipped with a lock member which is normally pivoted in a direction of said lower case to perform locking and is pivoted in a direction opposite to said lower case to release the locking when a magnet is approached externally, said lock member being provided with a magnet segment or a magnetizing member;

said upper case having opening portions at the front and rear sides in the slide direction of said lower case.

3. A fluorescent glass dosimeter comprising:
a fluorescent glass element having both fluorescence direction surfaces with chamfers;
a glass element holder made of heat resisting material for holding a fluorescent glass element while masking the chamfers of both fluorescence detection surfaces; and
an index plate having an identification hole code arranged at a predetermined position of an integrally extended portion of said glass element holder.

4. The fluorescent glass dosimeter according to claim 3, further comprising:
a direction regulating member for the glass element provided to said lower case; and
an engaging portion which is arranged on one side surface of said glass element holder and is engaged with said direction regulating member for positioning said fluorescent glass element.

5. The fluorescent glass dosimeter according to claim 2, further comprising:
first filters, which are arranged on inner walls of said upper and lower cases opposing the fluorescence detection surfaces of said fluorescent glass element and each of which comprises at least one metal member selected from the group consisting of Sn, Cu, Fe, A, Pb, Cd, for adjusting energy dependency upon a radiation exposure; and
second filters, which are arranged at a position near said glass element holder fitting position of said lower case and on an ultraviolet incident side and a side opposite thereto or on all side surfaces, for adjusting direction dependency upon an incident radiation.

* * * * *